US010719170B2

(12) United States Patent
Kurz

(10) Patent No.: US 10,719,170 B2
(45) Date of Patent: *Jul. 21, 2020

(54) METHOD AND DEVICE FOR DETECTING A TOUCH BETWEEN A FIRST OBJECT AND A SECOND OBJECT

(71) Applicant: Apple Inc., Cupertino, CA (US)

(72) Inventor: Daniel Kurz, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/274,968

(22) Filed: Sep. 23, 2016

(65) Prior Publication Data
US 2017/0075502 A1 Mar. 16, 2017

Related U.S. Application Data

(63) Continuation of application No. 14/223,601, filed on Mar. 24, 2014, which is a continuation-in-part of
(Continued)

(51) Int. Cl.
*G06F 3/042* (2006.01)
*G06F 3/01* (2006.01)
(Continued)

(52) U.S. Cl.
CPC ............ *G06F 3/0425* (2013.01); *G06F 3/011* (2013.01); *G06F 3/017* (2013.01); *G06T 19/006* (2013.01); *H04N 5/33* (2013.01)

(58) Field of Classification Search
CPC .................................................... G06F 3/011
See application file for complete search history.

(56) References Cited

U.S. PATENT DOCUMENTS 5,644,687 A * 7/1997 Agonafer ............ G06F 17/5018
345/419
8,275,413 B1 9/2012 Fraden
(Continued)

FOREIGN PATENT DOCUMENTS

| CN | 201383133 Y | 1/2010 |
| CN | 103017909 A | 4/2013 |

(Continued)

OTHER PUBLICATIONS

Larson et al, HeatWave: Thermal Imaging for Surface User Interaction, pp. 1-10, CHI 2011, May 7-12, 2011.*
(Continued)

*Primary Examiner* — Dorothy Harris
(74) *Attorney, Agent, or Firm* — Blank Rome LLP

(57) ABSTRACT

The present disclosure is related to a method and device for detecting a touch between at least part of a first object and at least part of a second object, wherein the at least part of the first object has a different temperature than the at least part of the second object. The method includes providing at least one thermal image of a portion of the second object, determining in at least part of the at least one thermal image a pattern which is indicative of a particular value or range of temperature or a particular value or range of temperature change, and using the determined pattern for detecting a touch between the at least part of the first object and the at least part of the second object.

17 Claims, 9 Drawing Sheets

Related U.S. Application Data application No. PCT/EP2014/053017, filed on Feb. 17, 2014.

(51) Int. Cl.
*G06T 19/00* (2011.01)
*H04N 5/33* (2006.01)

(56) References Cited

U.S. PATENT DOCUMENTS

| | | | |
|---|---|---|---|
| 8,638,364 | B2 | 1/2014 | Chen |
| 8,891,820 | B2 | 11/2014 | Owechko |
| 2005/0025345 | A1* | 2/2005 | Ohta .................... B60H 1/0065 382/116 |
| 2006/0062448 | A1* | 3/2006 | Hirsch ................ A61B 5/0059 382/154 |
| 2009/0287361 | A1 | 11/2009 | Iwashima |
| 2010/0177968 | A1 | 7/2010 | Fry |
| 2011/0050643 | A1 | 3/2011 | Zhao |
| 2012/0075462 | A1 | 3/2012 | Chen |
| 2012/0075463 | A1 | 3/2012 | Chen |
| 2012/0146903 | A1* | 6/2012 | Arihara .................... G06F 3/011 345/158 |
| 2012/0224067 | A1 | 9/2012 | Stuart |
| 2012/0320158 | A1 | 12/2012 | Junuzovic |
| 2013/0022274 | A1 | 1/2013 | LawrenceAshokInigo |
| 2013/0257751 | A1 | 10/2013 | Stafford |
| 2014/0078049 | A1 | 3/2014 | Parshionikar |
| 2014/0201685 | A1 | 7/2014 | Lim |
| 2015/0084884 | A1 | 3/2015 | CherradiElFadili |
| 2016/0109961 | A1 | 4/2016 | Parshionikar |

FOREIGN PATENT DOCUMENTS

| | | |
|---|---|---|
| CN | 103141080 A | 6/2013 |
| WO | 2012039836 A1 | 3/2012 |
| WO | 2012040114 A1 | 3/2012 |
| WO | 2013016104 A1 | 1/2013 |

OTHER PUBLICATIONS

Sato et al, Fast tracking of hands and fingertips in infrared images for augmented desk interface, Automatic Face and Gesture Recognition Proceedings, Fourth IEEE International Conference, pp. 462-467, 2000.*
Saba et al, Dante Vision: In-Air and Touch Gesture Sensing for Natural Surface Interaction with Combined Depth and Thermal Cameras, ESPA 2012 IEEE, 2012, pp. 167-170.*
Otsu, A Threshold Selection Method from Gray-Level Histograms, IEEE Transactions on Systems, Man, and Cybernetics, vol. SMC-9, No. 1, Jan. 1979 pp. 62-66.*
Shapiro et al, Computer Vision, Chapter 5, Mar. 2000, pp. 1-61.*
Definition of heat downloaded from <https://www.thefreedictionary.com/heat> Nov. 22, 2019 (Year: 2019).*
"Thermo-Key: Human Region Segmentation from Video Using Thermal Information," Presentation at SIGGRAPH2003, URL: http://nae-lab.org/project/thermo-key/ [Retrieved from the Internet on Jun. 19, 2014.
Amemiya,"Visualizing Thermal Traces to reveal histories of human object interactions," Universal Access in HCI, Part II, HCII 2009, LNCS 5615, pp. 477-482.
C. Harrison, H. Benko, and A. D. Wilson, "Omnitouch: Wearable multitouch interaction everywhere," In Proceedings of the 24th Annual ACM Symposium on User Interface Software and Technology, UIST '11, pp. 441-450, 2011.
Calian, D. A., Mithchell, K., Nowrouzezahrai, D., & Kautz, J., "The Shading Probe: Fast Appearance Acquisition for Mobile AR," SIGGRAPH Asia 2013 Technical Briefs, 2013, 20.
Daisuke Iwai and Kosuke Sato, "Document Search Support by Making Physical Documents Transparent in Projection-Based Mixed Reality," Virtual Reality, Springer-Verlag London Limited, vol. 15, No. 2, pp. 147-160, 2011.
Daisuke Iwai and Kosuke Sato, "Heat Sensation in Image Creation with Thermal Vision," ACM SIGCHI International Conference on Advances in Computer Entertainment Technology (ACE2005), pp. 213-216, Jun. 2005.
Daisuke Iwai and Kosuke Sato, "Limpid Desk: See-Through Access to Disorderly Desktop in Projection-Based Mixed Reality," VRST 2006, ACM, pp. 112-115, 2006.
Daisuke Iwai, Sawako Hanatani, Chinatsu Horii, and Kosuke Sato, "Limpid Desk: Transparentizing Documents on Real Desk in Projection-Based Mixed Reality," IEEE VR 2006 Workshop Emerging Display Technologies, pp. 30-31, 2006.
David Vanoni et al., "ARtifact: Tablet-Based Augmented Reality for Interactive Analysis of Cultural Artifacts," Multimedia (ISM), 2012 IEEE International Symposium on, IEEE, Dec. 10, 2012, (Dec. 10, 2012), pp. 44-49, XP032323103, DOI: 10.1109/ISM.2012.17, ISBN: 978-1-4673-4370-1.
FLIR ONE, Personal thermal imaging device for your iPhone5 and iPhone5s, URL: www.flir.com/flirone [Retrieved from the Internet on Jun. 19, 2014].
Gun A. Lee et al., "Occlusion based interaction methods for tangible augmented reality environments," Proceedings of the 2004 ACM SIGGRAPH International Conference on Virtual Reality Continuum and Its Applications in Industry, VRCAI '04, Jan. 1, 2004 (Jan. 1, 2004), pp. 419, XP055005457, New York, New York, USA, DOI: 10.1145/1044588.1044680, ISBN: 978-1-58-113884-9.
Kong et al., "Multiscale Fusion of Visible and Thermal IR Images for Illumination-Invariant Face Recognition," International Journal of Computer Vision 71 (2), 215-233, 2007.
Kumar et al., "Visual and Thermal Image Fusion for UAV Based Target Tracking," MATLAB—A Ubiquitous Tool for the Practidal Engineer, Prof. Clara Ionescu (Ed.), ISBN: 978-953-307-907-3, InTech, DOI: 10.5772/23996, Available from: http://www.intechopen.com/books/matlab-a-ubiquitous-tool-for-the-practical-engineer/visual-and-thermal-image-fusion-for-UAV-based-target-tracking (2011).
Nishino, K. & Nayar, S. K., "Eyes for Relighting," ACM Transactions on Graphics (TOG), 2004, 23, 704-711.
Peiris et al., "A Temperature-based Touch-sensor for Non-Emissive Textile Displays," CHI 2013: Changing Perspectives, Paris, France, 2013, pp. 1605-1610.
Yao, Y., Kawamura, H., & Kojima, A., "The Hand as a Shading Probe," ACM SIGGRAPH 2013 Posters, 2013, 108.
Wilson, Andrew D., "Using a Depth Camera as a Touch Sensor," ITS 2010: Devices & Algorithms, Nov. 7-10, 2010, Saarbrucken, Germany.

* cited by examiner

METHOD AND DEVICE FOR DETECTING A TOUCH BETWEEN A FIRST OBJECT AND A SECOND OBJECT

BACKGROUND OF THE INVENTION

1. Technical Field

The present disclosure is related to a method and device for detecting a touch between at least part of a first object and at least part of a second object, wherein the at least part of the first object has a different temperature than the at least part of the second object. The disclosure is also related to a computer program product comprising software code sections which are adapted to perform such method.

2. Background Information

A natural way for humans to interact with (real) objects is to touch them with their hands. For example, in current Augmented Reality (AR) applications, interaction with real and virtual objects usually involves the user's hand and a screen displaying an image of the real object, instead of interacting with real objects directly. Such screens that allow detecting and localizing touches on their surface are commonly known as touch screens and are nowadays common part of, e.g., smartphones and tablet computers. A current trend is that displays for AR are becoming smaller and/or they move closer to the retina of the user's eye. This is for example the case for head-mounted displays, and makes using touch screens difficult or even infeasible.

One possible solution in this case is to use occlusion-based interaction methods, such as described in references PCT Patent Publication No. WO 2013/016104 A1 and "Occlusion Based Interaction Methods for Tangible Augmented Reality Environments", Lee et al., VRCAI '04 Proceedings of the 2004 ACM SIGGRAPH international conference on Virtual Reality continuum and its applications in industry, pages 419-426, 2004; (hereinafter "Lee"). In these methods, an interaction event is triggered if a certain area of a real object is occluded from the viewpoint of a camera. Note that the camera's pose (i.e. position and orientation) with respect to the real object needs to be known to being able to identify such occlusions. This pose can either be determined once offline or continuously during runtime which allows for motion of the real object and/or the camera. Such occlusion-based interaction is, for example, part of the Vuforia SDK under the name "virtual buttons". Occlusion-based virtual buttons have the following shortcomings: they cannot distinguish if an object (e.g. fingertip) actually touches the virtual button or if it only occludes it and they cannot distinguish if the occlusion (or touch) is caused by a finger(tip) on purpose or by any other object (e.g. a sleeve hem) by accident.

The following common approaches exist to detect a touch between at least part of a human body and an object. The most common approach is to physically equip the object or the human body (e.g. fingertip) with a sensor capable of sensing touch. This could be anything from a simple mechanical switch to a touch-pad or touch screen. It could, for example, also be based on electrical voltage applied to the body and closing a circuit when touching a real object. The limitation of such kinds of approaches is that they require modifications of the object or the human body.

A touch can also be detected if the pose of the part of the body, e.g. the hand, is known relative to the object. There are many approaches aiming at tracking the pose of a finger or a hand. These can be based on one or more cameras that sense visible light and/or depth, e.g. using a time-of-flight camera, or active stereo based on infrared structured light. There are also approaches that equip a user's hand with sensors, e.g. inertial sensors, to sense the pose of the hand. The limitation of all these approaches is that the determined pose of a hand or finger is too inaccurate to reliably tell if a fingertip touches a real object or if it is only very close to it, e.g. 2 mm apart from the object.

Other approaches, as described in PCT Patent Publication No. WO 2013/016104 A1 and Lee, such as the virtual buttons in the Vuforia SDK mentioned above, do not aim at detecting a touch but at detecting an occlusion resulting in many limitations. Virtual buttons need to have certain size that allows to robustly identify if the button is occluded or not. It would, for example, not be feasible to subdivide an A4 sheet of paper into a grid of 297×210 virtual buttons with a size of 1×1 mm each. This limits the application of virtual buttons to tasks that do not require precise and continuous positional input, but only discrete button triggers. Furthermore, these virtual buttons need to have a visual appearance different from that of a finger, so that occlusions can be identified. The fact that these methods detect occlusions instead of touches results in another severe limitation, which will be discussed in the following at the example of a number pad. With virtual buttons it is impossible to trigger a button, e.g. No. 5 out of an array of adjacent buttons on a number pad, without triggering any other button before, because the button No. 5 cannot be reached without occluding any of the surrounding buttons. This puts heavy constraints on the layout of virtual buttons. Furthermore, while touching or occluding the button No. 5 on a number pad, the hand will additionally occlude other buttons at the same time. In Lee, the authors propose to solve this issue by only considering the top-left button in case multiple buttons are occluded, but this is a very heuristic and unreliable method.

In PCT Patent Publication No. WO 2012/039836 A1, a blow tracking user interface system and method is described, wherein embodiments thereof are directed to user interfaces for control of computer systems, and more specifically to user interfaces that track the blowing of a user's breath to provide control input to a computer program. This blow tracking is done based on thermal infrared imaging.

A user interface system and method using thermal imaging is described in PCT Patent Publication No. WO 2012/040114 A1. It describes a user interface based on obtaining one or more thermal infrared images of one or more objects with one or more thermographic cameras, analyzing the thermal infrared images, identifying characteristics of the objects from the thermal infrared images and using the characteristics as a control input in the computer program. The objects are users and the characteristics are vital signs.

U.S. Patent Publication No. US 2011/0050643 A1 discloses a passive infrared sensing user interface and device using the same. A device includes a passive infrared sensor for user interface. When a user places his finger over the infrared sensor, the sensor generates a digital signal indicating the time, position, or movement of the user finger over the sensor. The user finger does not need to touch or press the infrared sensor, but it can be used for touchless user interfaces.

SUMMARY OF THE INVENTION

It is an object of the invention to provide a method and device for detecting a touch between a first object and a second object which may be implemented without using a touch screen and does not provide the drawbacks as mentioned above.

According to an aspect, there is provided a method of detecting a touch between at least part of a first object and at least part of a second object, wherein the at least part of the first object has a different temperature than the at least part of the second object, comprising the steps of providing at least one thermal image of a portion of the second object, determining in at least part of the at least one thermal image a pattern which is indicative of a particular value or range of temperature or a particular value or range of temperature change, and using the determined pattern for detecting a touch between the at least part of the first object and the at least part of the second object.

More particularly, with determining the pattern thermal energy is detected which is transferred from one of the first or second object to the respective other of the first or second object. Advantageously, in this way thermal energy, such as thermal radiation, is detected that is emitted by a surface of one of the first or second object after it was touched by the respective other object (e.g., a human body such as a finger), instead of trying to detect the object (i.e. body or finger) itself as in the prior art.

For example, the first object is at least part of a human body. The second object may be, in principle, any object in a real environment.

With the present invention at least one touch between at least part of a human body and at least one object may be determined by detecting radiation in the infrared range emitted by the at least one captured object at those parts of the surface where the at least one touch occurred. For capturing a thermal image, a thermal camera, such as an infrared thermographic camera, may be used.

The invention, for instance, enables many useful applications in the field of Augmented Reality (AR) and other areas dealing with human computer interfaces, particularly tangible user interfaces.

Advantageously, with the present invention it can be accurately determined if a surface of a real object was actually touched or only occluded (or approached but not touched). It can distinguish touches or occlusions caused by a human body (that happened on purpose) from touches or occlusions by anything else (that might happen by accident). It is capable of precisely localizing a touch and can identify touch events after they occurred (i.e. even if no camera, computer or whatsoever was present at the time of touch).

According to an embodiment, the at least part of the second object and the portion of the second object may or may not overlap. The touching or touched part of the second object may not be captured in the at least one thermal image, as it may be occluded by the first object (as e.g. shown in FIG. 3 described in more below). Thus, the term "at least part of the second object" represents the touching or touched part of the second object and the term "portion of the second object" represents the imaged part of the second object. For example, the at least part of the second object could be on the front side of a thin object while the portion of the second object is located on the back side of the thin object. This also becomes evident in more detail below.

According to an embodiment, the method further comprises determining a position, a size, an orientation, a direction, a trajectory, or a shape of the detected touch in the thermal image.

According to a further embodiment, the method further comprises providing the detected touch as an input to a machine interface program, wherein the detected touch changes a state in the machine interface program. For example, the machine interface program is part of a human machine interface which may be used, for example, in a mobile device such as a smartphone, a tablet computer, a wearable computer, or a head-mounted device.

According to an embodiment, determining the pattern comprises determining one or more differences between temperatures measured at different positions in the at least one thermal image.

According to another embodiment, determining the pattern comprises computing a first or second derivative of temperature in the thermal image with respect to position.

For example, determining the pattern comprises computing a first or second derivative of temperature in the thermal image with respect to time.

According to an embodiment, determining the pattern comprises determining a temperature distribution between at least two temperature intervals which are indicative of a respective temperature of the first and second object.

For example, the method further comprises determining whether a first of the intervals shows a first increase in temperature followed by a second increase, which is steeper than the first increase, and whether a second of the intervals shows a first descent in temperature followed by a second descent, which is less steep than the first descent.

The method may further comprise calculating a histogram of temperatures in the at least one thermal image and using the histogram as a basis to define at least one of the first and second intervals and an interval between the first and second intervals that is determined for detecting a touch.

The method may further comprise obtaining a measurement of the temperature of the air or of the environment using a thermometer as a basis to define at least one of the first and second intervals and an interval between the first and second intervals that is determined for detecting a touch.

The method may further comprise obtaining information on the current weather situation (e.g. from a server, a database, or a distributed web service) as a basis to define at least one of the first and second intervals and an interval between the first and second intervals that is determined for detecting a touch.

According to an embodiment, determining the pattern comprises determining a temperature distribution of at least one sample line in the at least one thermal image which can have any orientation within the thermal image.

According to a further embodiment, determining the pattern comprises determining a cluster (such as a blob) in the thermal image which satisfies one or more constraints on its size and/or average temperature.

According to an embodiment, the method comprises providing a sequence of thermal images which comprises at least two thermal images of a portion of the second object.

For example, determining the pattern comprises determining a change of temperature between the at least two thermal images and determining whether the change is above a first defined threshold and/or below a second defined threshold.

According to a further embodiment, determining the pattern comprises determining a derivative of temperature between the at least two thermal images and determining whether the derivative is above a defined first threshold and/or below a second defined threshold.

According to an embodiment, determining the pattern comprises determining a first change of temperature between the at least two thermal images and a second change of temperature between the at least two thermal images, and using the first and second changes and derivatives of the first and second changes for detecting a touch.

According to an embodiment, the method further comprises imaging a portion of the second object by a visible light camera and a thermal camera providing the at least one thermal image, providing a first spatial transformation between the visible light camera and the thermal camera, providing a second spatial transformation between the visible light camera and the imaged portion of the second object, concatenating the first and second spatial transformations resulting in a third spatial transformation between a coordinate system of the imaged portion of the second object and a coordinate system of the thermal camera, and determining a position and orientation of the thermal camera in the coordinate system of the imaged portion of the second object based on the third spatial transformation.

For instance, the method may further comprise determining a position of a touch in the at least one thermal image, wherein the position of the touch in the coordinate system of the imaged portion of the second object is determined by intersecting a ray originating from an origin of the thermal camera transformed to the coordinate system of the imaged portion of the second object and pointing towards the location of the detected touch on the image plane of the thermal camera with a model of the imaged portion of the second object, wherein the intersection is used to trigger a touch event at that position.

Advantageously, the method is applied as part of a human machine interface in an Augmented Reality application. For example, detecting a touch comprises detecting a part of a user touching at least a part of the second object at a place where virtual information is displayed to the user, wherein upon detecting the touch the virtual information is manipulated.

The method may be used within an application using a video-see-through setup, an optical-see-through setup, or a projective AR setup. Particularly, the method is used with a hardware setup that does not include a touch screen interface.

According to another aspect, there is disclosed a device for detecting a touch between at least part of a first object and at least part of a second object, wherein the at least part of the first object has a different temperature than the at least part of the second object, comprising a processing device adapted to receive image information of at least one thermal image of a portion of the second object, the processing device configured to determine in at least part of the at least one thermal image a pattern which is indicative of a particular value or range of temperature or a particular value or range of temperature change, and the processing device configured to use the determined pattern for detecting a touch between the at least part of the first object and the at least part of the second object.

According to an embodiment, the processing device is communicating with a thermal camera for providing the at least one thermal image, wherein at least one of the processing device and the thermal camera is implemented in or associated with a head-mounted display or a projector for performing projector-based Augmented Reality.

All embodiments and examples described herein with respect to the method can be equally implemented by the processing device being configured (by software and/or hardware) to perform the respective steps. Any used processing device may communicate via a communication network, e.g. via a server computer or a point to point communication, with a thermal camera and/or other components, such as a visible light camera, or with a server computer.

For example, the processing device (which may be a component or a distributed system) is at least partially comprised in a mobile device which is associated with the thermal camera, and/or in a computer device which is adapted to remotely communicate with the thermal camera, such as a server computer adapted to communicate with the thermal camera or mobile device associated with the thermal camera. The system according to the invention may be comprised in only one of these devices, or may be a distributed system in which one or more processing tasks are distributed and processed by one or more components which are communicating with each other, e.g. by point to point communication or via a network.

According to another aspect, the invention is also related to a computer program product comprising software code sections which are adapted to perform a method according to the invention. Particularly, the software code sections are contained on a computer readable medium which is non-transitory. The software code sections may be loaded into a memory of one or more processing devices as described herein. Any used processing devices may communicate via a communication network, e.g. via a server computer or a point to point communication, as described herein.

BRIEF DESCRIPTION OF THE DRAWINGS

Aspects and embodiments of the invention will now be described with respect to the drawings, in which.

DETAILED DESCRIPTION

In the following, embodiments and exemplary scenarios are described, which shall not be construed as limiting the invention.

In an exemplary scenario, a touch between at least part of a human body and an object results in thermal energy being transferred from the at least part of a human body to the object. This thermal energy then results in the emission of radiation in the infrared range. This can be sensed using an infrared thermographic camera and be used as a human computer interface, in particular to detect a touch and as a result trigger a touch event.

Figure 1:
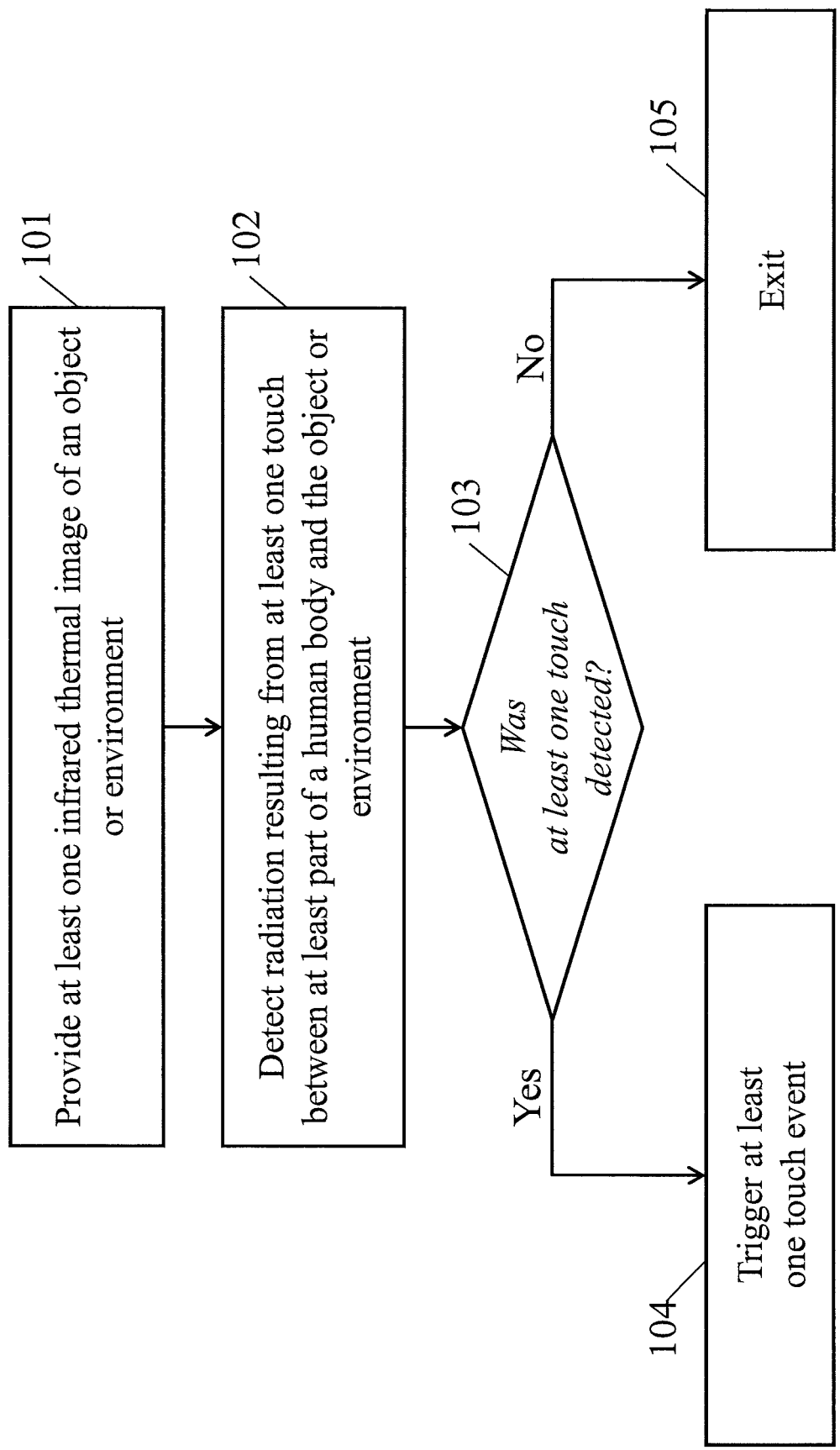
FIG. 1 shows a flowchart of a method according to an embodiment of the invention.

FIG. 1 shows a flowchart of a method according to an embodiment of the invention. In a first step 101, at least one thermal image (e.g. infrared thermal image) of an object or environment is provided. In a second step 102, radiation resulting from at least one touch between at least part of a human body and the object or environment is automatically detected if present. If radiation resulting from at least one touch could be detected (step 103), at least one touch event is triggered (step 104). Otherwise, the method exits (step 105).

The present invention is capable of distinguishing multiple situations. The general assumption for this embodiment of the invention is that the real object has a temperature different from the temperature of a human, which is usually around 36.5° C. Only if a part of the human body, for example the fingertip, actually touches a real surface, then it will transfer sufficient thermal energy to the real object at the area where they touch, such that the resulting radiation emitted by the object in the infrared range is clearly measurable with a thermographic camera. Optionally this invention can be implemented, such that only if the entity that touches the real object has a temperature similar to 36.5° C., a touch will be detected. Thermographic cameras are available at low-cost and ubiquitous presently and in the near future, see e.g. FLIR ONE, Personal thermal imaging device for your iPhone5 and iPhone5s, www.flir.com/flirone.

Figure 2:
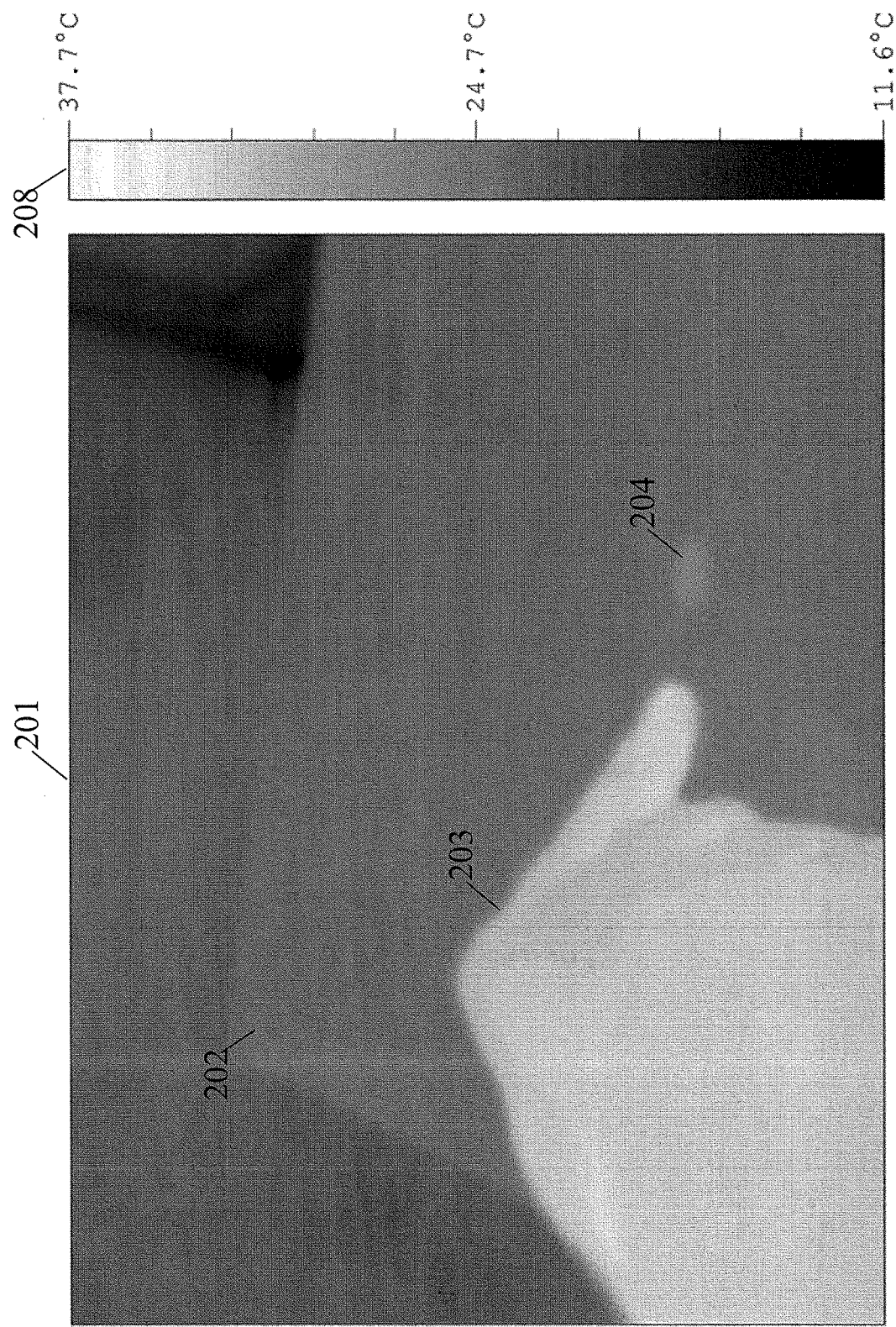
FIG. 2 shows an example of a thermal image mapped to grayscale for visualization which may be used in connection with the present invention.

FIG. 2 shows an example of a thermal image which may be used in connection with the present invention. Particularly, FIG. 2 shows a hand through a thermal image. The hand can be clearly distinguished from the background, because it has a higher temperature. When a fingertip touches a surface 202, it transmits thermal energy to the surface. This becomes visible in the thermal camera image as a warm fingerprint (spot 204) on the surface once the fingertip moved away. FIG. 2 shows a thermal image 201 which is mapped to grayscale for visualization. In this case, the scene (surface) 202 has a lower temperature than a hand 203. There is also visible a spot 204 with an increased temperature relative to the remaining scene, which is indicative of a position where the hand recently touched the scene. A bar 208 visualizes the mapping from temperatures in degrees Celsius to grayscale for better understanding. By detecting such warm fingerprints, it can be identified that a touch between the hand and a surface happened recently. Furthermore the location of this touch can be accurately determined in the image of the thermographic camera. It is further possible to determine a touch at the time it happens by detecting heat that is transferred to the surface close to the touch, see e.g. FIG. 3.

Figure 6:
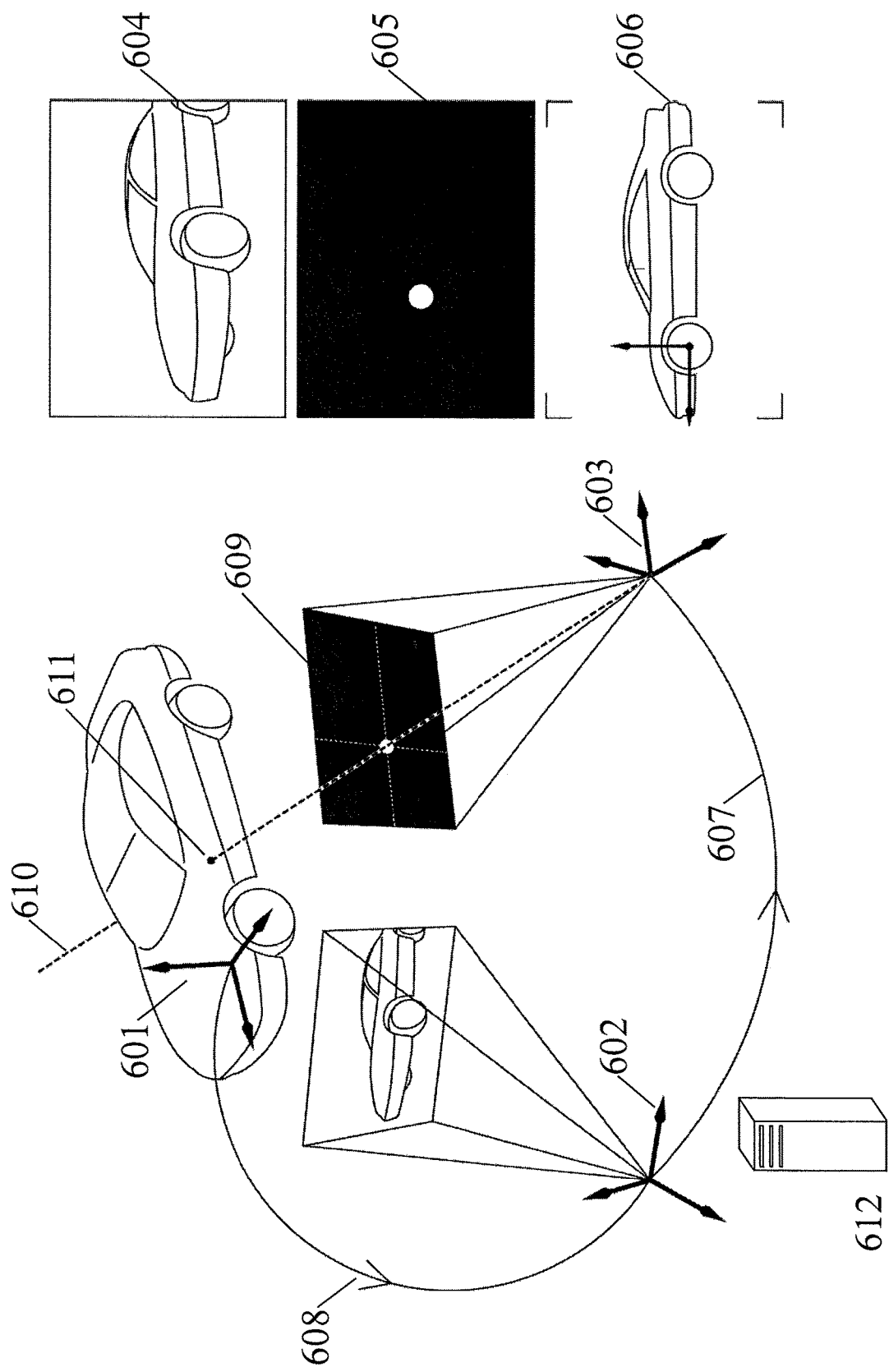
FIG. 6 shows an exemplary embodiment of the invention in which a real object is imaged by a visible light camera and an infrared thermal camera.
Figure 7:
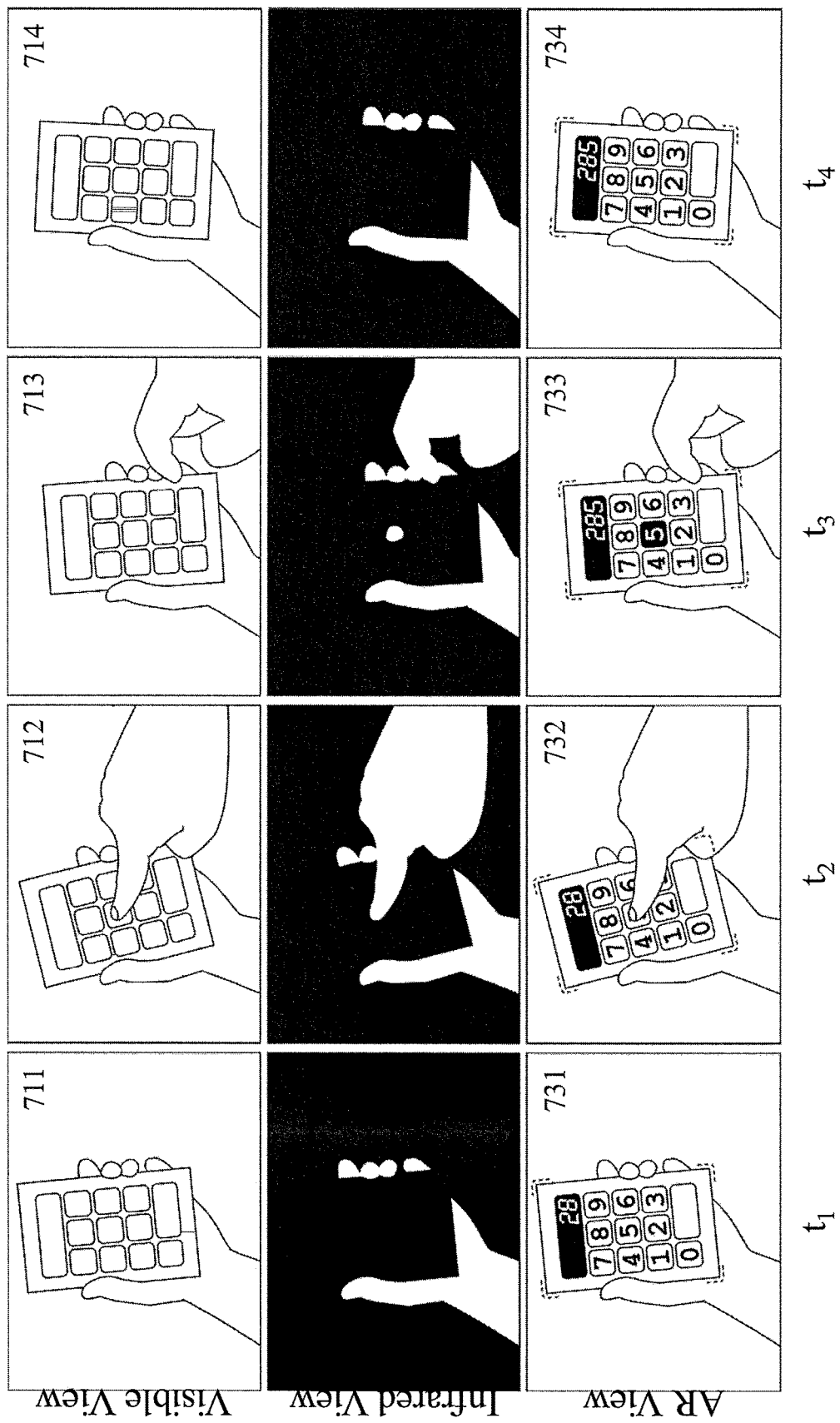
FIG. 7 shows an embodiment of the invention which could be used as a human machine interface in an Augmented Reality application.

As described above, an infrared thermographic image allows detecting a touch by a user on arbitrary and unmodified real objects, which can then be used as (tangible) user interaction devices. An exemplary application of this method would, in addition to the thermographic camera, use a visual light camera enabling an Augmented Reality experience as shown in FIG. 6 and FIG. 7.

For example, a user holds a real object in his or her hands which is localized in the visual light camera image. On this object there are virtual buttons which were printed as gray areas onto the real object in this example. The thermal image of the same scene reveals a warm fingerprint caused by a part of a human body (a finger tip) touching the object. The position of this touch can be localized in the thermal camera image. Because the visual light camera is calibrated with respect to the thermal camera, and the shape, position and orientation of the real object is known with respect to the visual light camera, the position of the touch can be transformed to the coordinate system of the real object.

Any desired action with respect to the 3D position of this touch event may be performed, such as triggering a virtual button located on the real object at the position of the touch. The touch event can then affect the Augmented Reality application that displays virtual contents spatially registered overlaid on the live image feed of the visible light camera. In the described example, the touch would change the visualization of the button and also change the state of a virtual object which is rigidly attached to the real object and represents a virtual display.

The present invention can be used in any Augmented Reality application that requires interaction beyond changing the position and orientation of a camera or of a real object. It is particularly useful if the application requires the selection of one or more positions on the surface of a real object. It can be used for video-see-through, optical-see-through, or projective AR setups. The invention makes sense for handheld AR applications, but it is particularly interesting for hardware setups that do not include a touch screen interface, such as a head-mounted display or projector-based AR. It could be used in many different applications, for example all applications based on tracking printed materials such as magazines or books to directly click on advertisements or images for example to start a video. It could also be used in a maintenance application where a worker marks defects in paint work on a car by simply touching them with their fingers for later inspection. The invention enables a very intuitive and tangible way of human machine interaction without the need to modify the real object to interact with and without the need to attach hardware to the user's hands.

There are different approaches according to embodiments of the present invention to determine thermal energy an object has as a result of a touch (i.e. direct contact) with an object having different temperature.

One approach, which enables detection of a touch while the two objects still touch each other is based on heat distribution gradients measured according to the thermal camera image. While the transition between two objects with different temperatures that do not touch is abrupt and therefore has a strong gradient, the transition in the vicinity of a touch, i.e. physical contact between the two objects, becomes smoother resulting in less strong gradients in a larger area. This is further explained in connection with FIG. 3.

A different approach to determine a touch of two objects with different temperatures, which may be applied after the contact happened, is to localize clusters or blobs in the thermal image which satisfy certain constraints on their size and average temperature. For example, if the temperature of the two objects is approximately known, a method could localize clusters or blobs whose temperature corresponds to a mean value of the two known temperatures with a given tolerance. The size of clusters or blobs to consider as resulting from a touch can for example be constrained to a fixed range of pixels (e.g. the radius should be at least 5 pixels and not greater than 50 pixels). A constraint on the size of cluster or blobs to consider in the thermal image can further be derived from the size of one of the objects in the thermal image or in the image of a second camera which captures at least part of one of the two objects. This is further explained in FIG. 4.

The method according to an embodiment may determine a touch on an object which by chance has local changes in temperature, which could be identified as a blob in the thermal image as described above, but in fact are not caused by a touch. One approach to distinguish touches from static blobs of a certain temperature is to measure multiple samples of the temperature of a point over time, as will be described in the following.

A third approach to determine a touch of two objects with different temperatures is based on at least two thermal images of at least part of at least one of the objects. The assumption of this approach is that most objects—if not in contact with other objects at significantly different temperatures—change their temperature very slowly. Under the assumption of a static thermal camera, a single pixel would represent the temperature of a point in the environment. Talcing three samples at intervals of e.g. 0.5 seconds, the measured temperature will be very similar if the environment did not change during that time. If there is an object moving through the scene, which has a temperature different from that of the scene, the three samples may have very different temperatures because they do in fact not measure the temperature of a single point in the scene, but in at least one of the samples they measure the temperature of the moving object instead. Very rapid changes in temperature are usually due to occlusions by objects with different temperature. If two objects at different temperatures touch, the area where they touch will change their temperature and then slowly converge back to the initial temperature as before the touch. Therefore, for pixels corresponding to a point in the environment where a touch recently occurred, there reveals a slow but clearly measurable decrease or increase in temperature. Smooth changes in temperature can be indicative of a touch between two objects that recently happened at the sampled position. The same concept mentioned above can also be applied to a moving camera (e.g., there is a movement between the camera and each of the two objects). In this case, a tracking method may be required to determine a motion of the camera relative to each of the two objects or determine a spatial relationship between the camera and each of the two objects. This allows for sampling the temperature of the same point on the object at different points in time even if the camera or object moved.

As an example, any changes in temperature of less than 1° C. or 1° C./s could be classified as being static, any changes in temperature of more than 8° C. or 8° C./s could be classified as being due to occlusions, and any change in temperature in between these two values could be classified as potentially being a result of a touch. If this classification is performed for each pixel or for many samples on an object, spatial clusters (or blobs) of samples classified as potentially being a result of a touch can be found. If these clusters satisfy certain constraints, e.g. on their minimal size, or average temperature, a touch is considered to be detected.

Any embodiment determining a touch according to a change of temperature (i.e. temperature change) may use at least one difference of temperature (e.g. 3° C.) or at least one derivative of temperature (e.g. 3° C./s). The at least one difference of temperature may be a difference between temperatures at different positions in the coordinate system of the thermal image or different positions in the coordinate system of an object (e.g. the second object). The at least one difference of temperature may be a difference between temperatures measured at different times for the same or different positions (in the coordinate system of the thermal image or in the coordinate system of an object).

The at least one derivative of temperature may be a first derivative of the temperature with respect to time (e.g. 3° C./s) or with respect to position in the thermal image (e.g. 3° C./pixel) or with respect to position in an object coordinate system (e.g. 3° C./mm). Similarly a second derivative or derivative of any higher order may be used. The derivative of temperature of any order and with respect to any dimension (e.g. time, position) may be determined according to at least one temperature difference. A difference of time or a difference of positions may also be required to determine the derivative of temperature.

Thresholds, scales and other parameters used in the course of determining (the probability of) a touch from temperature or changes in temperature (changes may be for a temperature distribution over an area, or changes may also be for temperature of a position or area over time) can for example be derived from a histogram representing the distribution of temperatures in a thermal image, prior knowledge on (at least part of) the scene or objects and their temperature, the thermal conductivity of at least parts of the scene or objects, the air temperature measured with an (electronic) thermometer, information on the current weather situation, or by means of a spectrometer which serves as a basis to determine thermal properties of the scene or objects, such as thermal conductivity. These parameters can also be learnt in a supervised way given an example touch.

Note that in case of a non-static camera and/or a non-static scene or objects, approaches exist to track the position and orientation of an object relative to the camera. These tracking methods could be based on information obtained from the thermal image, it could use information captured with a second camera imaging at least part of the object or the thermal camera, or it could be based on any other mechanic, electromagnetic, acoustic, or optical tracking system. This allows for sampling the temperature of the same point on the object at different points in time even if the camera or object moved.

In general, a classification of temperature samples as being indicative of a point where a touch occurred can be based on the measured temperature, or the first derivative of the measured temperature with respect to time, or the second derivative of the temperature with respect to time. It can further be based on the first or second derivative of temperatures with respect to a position either in a coordinate system of the camera or in a coordinate system of an object. Classification based on any combination of the previous measures is also a preferred embodiment of this invention. The results of local classification results (e.g. per-pixel) can be further processed, e.g. by means of median filtering, mean filtering, dilation, erosion, or clustering.

In the following, the invention and embodiments thereof will be explained with referring to the drawings in FIGS. 3 to 5.

Figure 3:
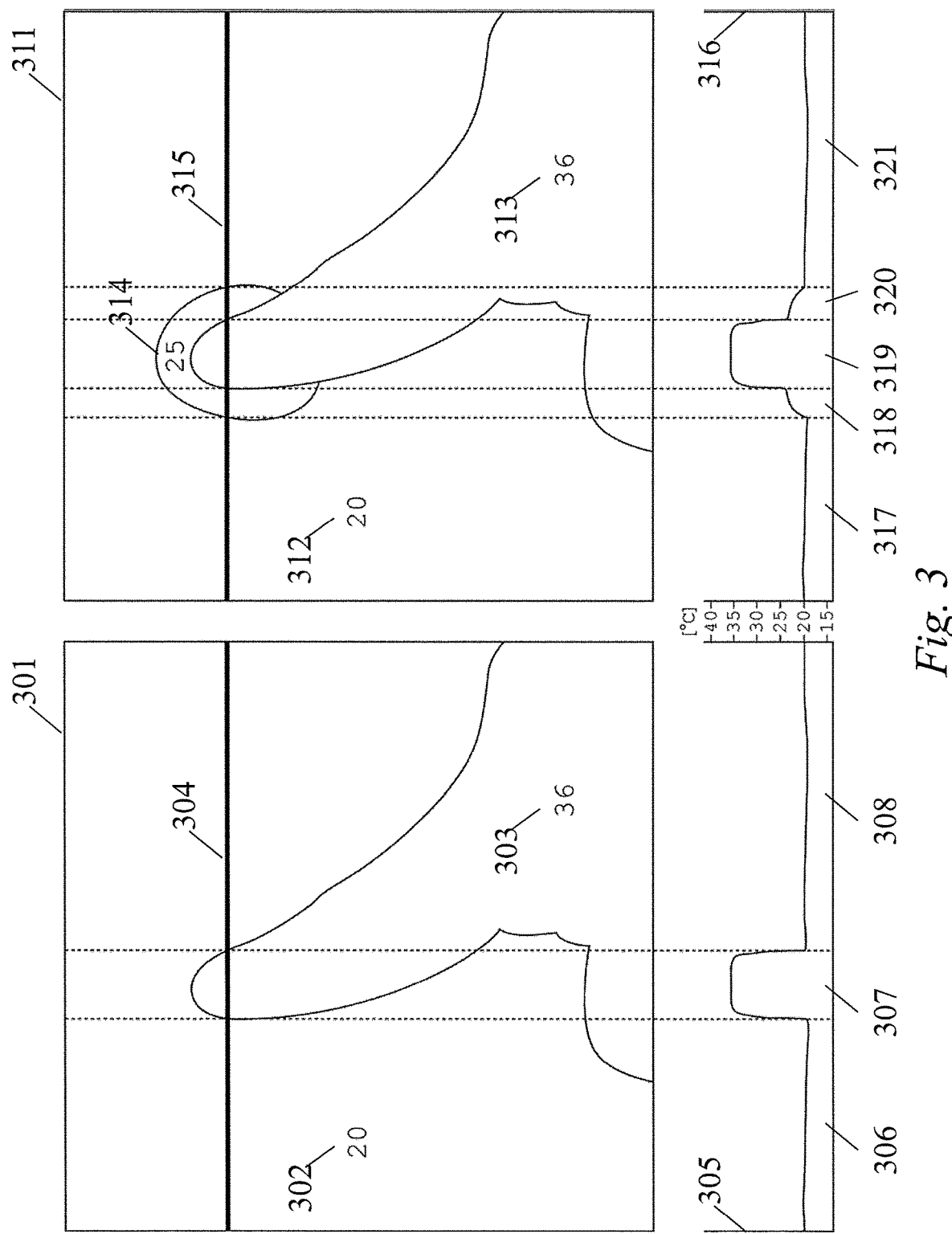
FIG. 3 shows another embodiment of the present invention to determine a touch between two objects based on the thermal energy transferred from one object to the other sensed with infrared thermography.

FIG. 3 shows another embodiment of the present invention to determine a touch between two objects based on the thermal energy transferred from one object to the other sensed with infrared thermography. A thermographic image 301 (left depiction) comprising a second object 302 at a low temperature and a first object 303, e.g. a hand at a higher temperature, is illustrated with isolines. The temperature for the row 304 of this image is plotted in temperature distribution profile 305. The row starts with a temperature of about 20 degrees (samples 306), which is the temperature of the second object. Then, at the transition to the first object 303, the temperature steeply increases to the temperature of the first object which has a temperature of about 36 degrees in this example (samples 307). When the row samples the second object 302 again, the temperature drops rapidly back to the original temperature of the second object (samples 308). This temperature distribution profile is indicative of that the two objects are not in direct contact, i.e. they do not touch each other.

The right thermal image 311 again shows a second object 312 and a first object 313 with different temperatures. The isoline visualization further shows a region 314 at a temperature in between the temperatures of the two objects. Looking at the temperature along the row 315 in temperature distribution profile 316, the first samples 317 correspond to the first object and its temperature. The interval 318 shows a smooth increase in temperature followed by a steep increase leading to the interval 319 which corresponds to the second object and its temperature. After a steep descent in temperature, the interval 320 shows a smooth decrease in temperature resulting in the temperature of the first object, which is sampled in the interval 321. This temperature distribution, particularly at the intervals 318 and 320, is indicative of a thermal energy transfer between the first and the second object as a result of a direct contact between the two, i.e. a touch.

The embodiment according to FIG. 3 is capable of detecting a touch at a time when the touch is actually occurring, e.g. by detecting the region 314 and intervals 318-320, respectively.

In the embodiment according to FIG. 3 the at least part of the second object which touches the first object, and the portion of the second object which is visible in the at least one thermal image, do not overlap. Because the finger (i.e. the first object) in this case occludes the at least part of the second object which touches the first object, the infrared thermal image does not image this part. Instead, determining a touch in this case is based on determining a pattern in at least one thermal image of a different part of the second object, particularly of an imaged region in the at least one thermal image adjacent to at least part of the first object (particularly of an imaged region in the at least one thermal image around at least part of the first object, e.g. the region adjacent to the at least part of the first object which touches the second object, here the region around the fingertip), and of a part of the first object (e.g. the finger).

Furthermore, in the embodiment according to FIG. 3, the at least part of the second object which touches the first object may (partially) be outside the field of view of the (infrared) thermal camera that captured the at least one thermal image.

An embodiment of the invention may use the temperature distribution of at least one sample line in the thermal image to determine a touch. The sample lines do not need to be an image row as the case for 304 and 315, but can have any orientation. They could be randomly sampled in the image, they could be sampled in a uniform distribution, or they could use the result of a fingertip tracking as input and select the sample lines such that they intersect with the fingertip and are orthogonal to the finger direction.

It is also possible to determine touches based on thermal images using supervised machine learning techniques, such as Decision trees, Ensembles, Bagging, Boosting, Random forest, k-NN, Linear regression, Naive Bayes, Neural networks, Logistic regression, Perceptron, or Support vector machine (SVM), which are trained with thermal images showing a touch and thermal images where no two objects of different temperature touch each other.

Figure 4:
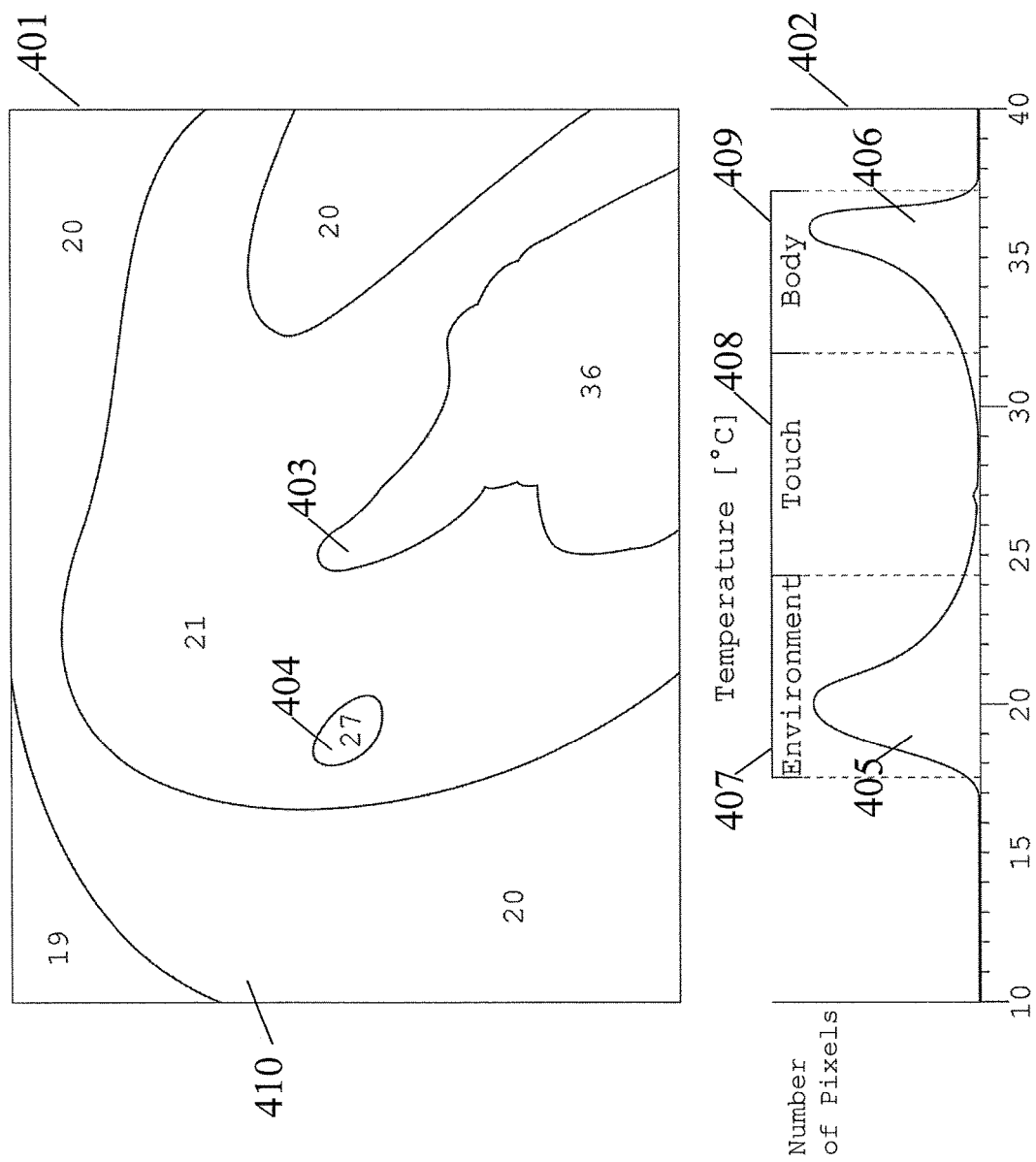
FIG. 4 shows a thermal image similar as the one shown in FIG. 2, but which has been discretized and visualized with isolines.

FIG. 4 shows a thermal image 401 which has been discretized and visualized with isolines (also known as contour lines). It also shows a histogram 402 of temperatures present in the thermal image. All two-figure numbers printed in the isoline visualization and at the horizontal axis of the histogram refer to temperature in degrees Celsius (° C.). In the thermal image 401 the printed temperatures refer to the average discretized temperature in a certain region of the image. The lines in the image indicate borders between different temperatures. The thermal image captures a human hand 403 (e.g. as first object), a warm spot 404 resulting from a touch between the finger and the environment, and the environment 410 (e.g. as second object). While the environment in this example has a temperature of 19-21 degrees Celsius, the hand has a temperature of 36 degrees Celsius. The histogram 402 shows two peaks of frequently occurring temperature ranges in the thermal image, where the first one 405 of the peaks corresponds to the environment and the second one 406 of the peaks corresponds to the hand, i.e. part of the human body.

One possible approach to identify and localize the touch from this single thermal image would be to use this histogram as a basis to define a temperature interval 407 corresponding to the temperature of the environment (e.g. second object) 410, an interval 409 corresponding to the temperature of the human hand (e.g. first object) 403, and an interval 408 between those two that should include the temperature of a touch. The actual touch can then be detected for example by means of blob detection, using e.g. Laplacian of Gaussian (LoG), Difference of Gaussians (DoG), Determinant of Hessian (DoH), or Maximally Stable Extremal Regions (MSER), in the thermal image considering only blobs with a temperature falling into the touch interval 408 and having a reasonable size. The expected size of a blob might be depending on the size of the fingertip, the size of the finger, or the size of the hand, as determined from the thermal image. As opposed to the embodiment described in the following in FIG. 5, this embodiment may be based on a single thermal image instead of a sequence of thermal images. Further, this embodiment evaluates absolute values of temperature, instead of temperature changes, gradients or derivatives as in other embodiments.

A position of the detected touch may be determined by localizing in the thermal image 401 the temperature(s) or range of temperatures as determined in the histogram 402 in the touch interval 408 by blob detection. In the present example, it would be possible to localize the warm spot 404 by searching in the image 401 for a cluster with temperature of 27° C., since a blob was detected at temperature 27° C. in interval 408 of the histogram 402.

In the embodiment according to FIG. 4, the at least part of the second object which touches the first object overlaps with the portion of the second object which is visible in the at least one thermal image. The pattern determination is based on the temperature of at least part of the "at least part of the second object" which touches the first object.

Figure 5:
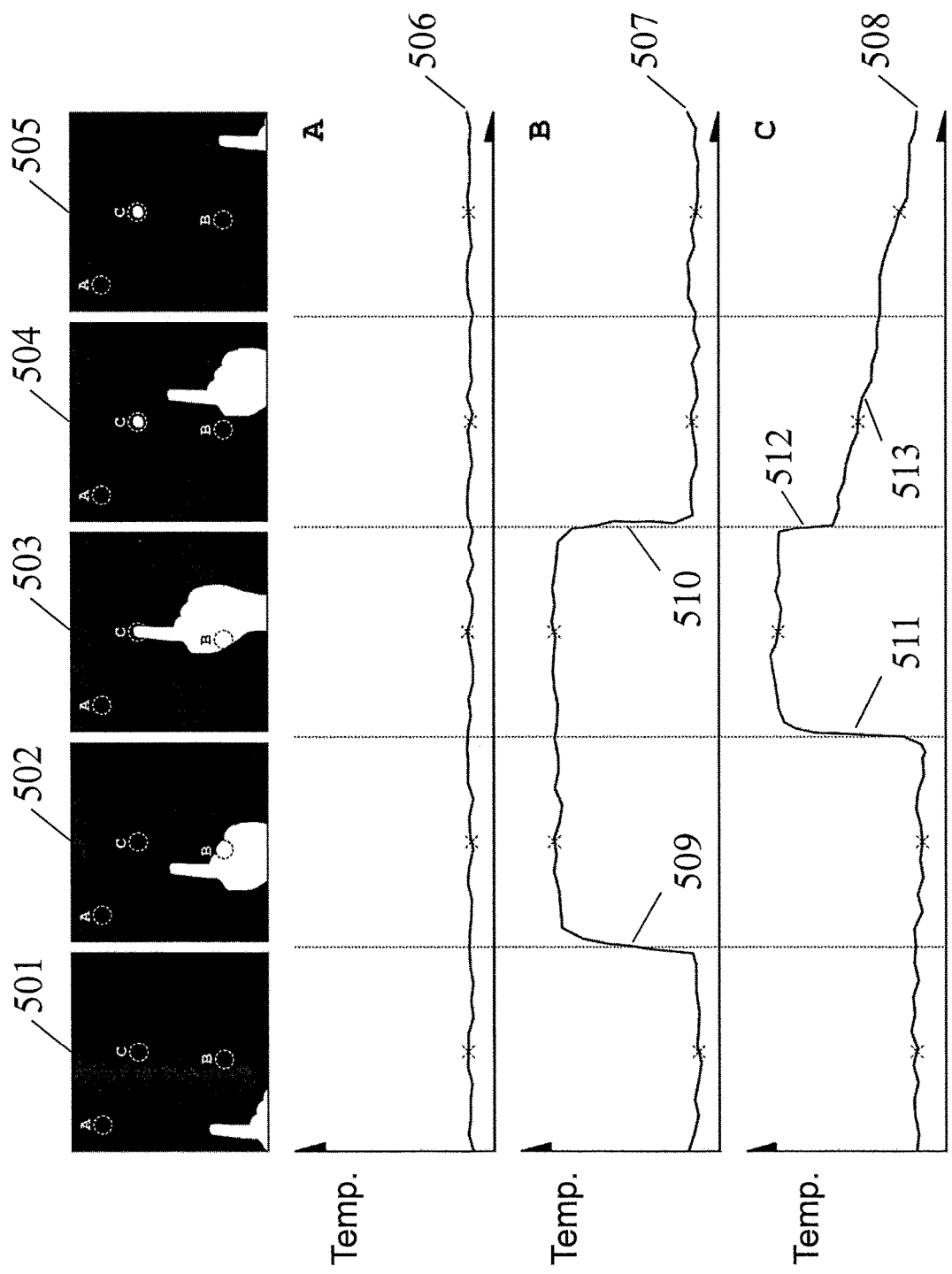
FIG. 5 shows a sequence of infrared thermal images according to an embodiment of the invention.

FIG. 5 shows a sequence of infrared thermal images 501-505 in which temperatures smaller than or equal to the temperature of the environment are shown in black and temperatures greater than the temperature of the environment are shown in white. Throughout this sequence a hand moves in front of the environment (images 501, 502) until it reaches a position to touch (image 503) and then moves away again (images 504, 505) leaving a white spot at the position where the hand touched the environment. In images 501-505, there are three areas marked and labeled as area A, area B, and area C. Plot 506 shows the temperature profile for area A during the sequence of images 501-505, plot 507 shows the corresponding temperature profile for area B, and plot 508 for area C. The plots include temperatures at a higher sampling rate than the images 501-505 show. The samples corresponding to the respective images 501-505 are indicated with crosses.

In area A (plot 506) the temperature remains low throughout the sequence, because this area only captures the environment. In area B (plot 507) we observe a steep incline 509 in temperature once it captures the hand instead of the environment. Similarly, once the hand leaves area B and the area captures the environment again, we observe a sharp decline 510 in temperature in that area. Area C corresponds to the area of the thermal image where the touch between the hand and the environment happens. Again, in the beginning of plot 508, while capturing the environment, the temperature is low and we observe a sharp incline 511 once the hand enters the area. When it leaves the area C, we observe a sharp but small decline in temperature 512 followed by a slow decrease in temperature 513 while the environment slowly emits the thermal energy it collected from the hand during the touch. The temperature profile of area C, particularly decline 512 and decrease 513, is characteristic for touch events and can be used to distinguish them from occlusions (as in area B) and environment (as in area A). Thereby a touch between a hand (as an example for a part of a human body and an example for a first object) and a second object as part of the environment can be identified and localized in a sequence of thermal images, comprising at least two thermal images in this embodiment.

For example, a determined value of a temperature change between the at least two thermal images may be used to determine the touch. The value of the temperature change is the difference (e.g. 3° C. or –3° C.) between the at least two temperatures measured at the area C at two different thermal images (e.g. the images 503 and 504) If the value is below a defined first threshold and/or above a second threshold, then a touch is determined, otherwise, no touch is determined.

In another example, a derivative of temperature between the at least two thermal images may be used to determine the touch. The derivative of temperature may be a first derivative of the temperature with respect to the time. The images 501-505 are captured at different time. The first derivative of the temperature with respect to the time (e.g. 6° C./s or -6° C./s) may be determined according to the value (e.g. 3° C. or –3° C.) of the temperature change of two different thermal images and the time difference (e.g. 0.5 s) between capturing the two different thermal images. Similarly, the derivative of temperature may be a second or any higher order derivative of the temperature with respect to the time. If the derivative is below a defined first threshold and/or above a second threshold, then a touch is determined, otherwise, no touch is determined.

According to an embodiment, more than one change may be computed. For example, a first change between the images 503 and 504, and a second change between the images 504 and 505 may be computed. Values and derivatives of the first and second changes may be used together to determine the touch. In one embodiment, if the values of the first and second changes are similar (e.g. below a threshold), then a touch is determined. Similarly, the derivatives of the first and second changes may be used.

There may not exist any captured thermal image or measured temperature at the moment between capturing the thermal images 501-505 as shown. There may also exist one or more captured thermal images or measured temperatures at the moment between capturing the thermal images 501-505.

In the embodiment according to FIG. 5, the at least part of the second object which touches the first object overlaps with the portion of the second object which is visible in the at least one thermal image. The pattern determination is based on the temperature of at least part of the "at least part of the second object" which touches the first object.

FIG. 6 shows an exemplary embodiment of the invention in which a real object 601 (in this case a car) is imaged by a visible light camera 602 and an infrared thermal camera 603. In this embodiment a 3D position of a touch may be detected. The respective images captured by the cameras are shown as sub-depictions, where depiction 604 is the image captured by the visual light camera 602, and depiction 605 shows the image captured by the infrared thermal camera 603. In this configuration, the spatial 6 degrees of freedom (DoF) transformation 607 (i.e. translation and orientation) between the two cameras 602, 603 is assumed to be known. The spatial 6DoF transformation 608 between the visible light camera 602 and the object 601 can be determined based on the image 604 captured by the visible light camera 602 and a model 606 of the real object. Concatenating the transformations 607 and 608 results in the transformation between the coordinate system of the object 601 and the coordinate system of the infrared thermal camera 603. Given this concatenated transformation, the position and orientation of the infrared thermal camera 603 can be expressed in the coordinate system of the real object. The setup may also comprise a processing device 612 which is implemented in, e.g., a mobile device worn or held by the user, a server computer or in any of the cameras described herein, or is a distributed system. It communicates with the cameras 602 and 603 in wired or wireless manner. In configurations without a visible light camera, it may communicate only with the thermal camera. It may be configured by hardware and/or software to perform one or more tasks as described herein.

A method may be applied to identify and localize a touch 609 in the image 605 captured by the infrared thermal camera 603. The position of this touch in the coordinate system of the object can for example be determined by intersecting a ray 610 originating from the origin of the infrared thermal camera 603 transformed to the coordinate system of the object and pointing towards the location of the touch 609 on the image plane (also expressed in the coordinate system of the object) with a model of the object, e.g. 606. The intersection point 611 can finally be used to trigger a touch event at that position. This touch event could then for example result in the 3D position being added to a database containing multiple positions of defects on the car (i.e., the user touches multiple locations of defects on the car, so that in this example touch 611 (and 609 in the infrared thermal image) localizes a location of defect).

In another embodiment camera 602 is a depth-sensing camera, e.g. a time-of-flight camera, a passive stereo camera, or an active stereo camera based on infrared structured light which may additionally sense visible light. In this case, the depth information associated to the captured image 604 could be used to determine the transformation 608 between the camera 602 and the real object 601 based on the model 606 of the real object. Furthermore, the depth information, e.g. represented as a 3D point cloud or as a 3D triangle mesh, could be used as a model 606 of the object acquired during runtime. In this case the transformation 608 would be arbitrary. In this configuration, the 3D position of a touch can be determined in the coordinate system of the object without any a priori model of the object. Therefore this embodiment can deal with any previously unknown object or environment. The depth-sensing camera could also be an additional camera which is physically separate from the visible light camera 602 if the transformation between the two cameras is known or has been calibrated.

FIG. 7 illustrates an example of how aspects of the invention could be used as a human computer interface in an Augmented Reality application. It should be noted that any of the approaches for determining a touch as described herein could be used, such as those described with reference to FIGS. 3-6. A scene is shown at four different points in time (t1, t2, t3, t4), arranged in different columns. For each point in time, an image captured by a visible light camera is shown in the first row. The second row shows a corresponding image captured with an infrared thermal camera, and the last row shows an Augmented Reality (AR) view. The AR view could for example be achieved by means of a video see-through setup using a mobile device comprising a visible light camera, an infrared thermal camera, and a display or a head-mounted display. It could furthermore be based on an optical see-through setup or a projective AR setup. Note that in this example we assume the images of the visible light camera and the infrared thermal camera to be aligned, which can for example be achieved by means of a beamsplitter. In this case, the transformation 607 in FIG. 6 would be the identity transform.

At the first point of time t1, there is an object located in the palm of a hand visible in the camera image 711. The same scene in the infrared thermal image 721 shows the hand being warm (white) while the remaining part of the image is cold (black). In the AR view 731, the visible light camera image is shown along with virtual information that is overlaid spatially registered with the object. In this case, the virtual information comprises labels for buttons that are appearing as printed onto the real object and a label for a screen on top showing which buttons were triggered. The spatial registration of the virtual contents and the visible light camera image is achieved by performing visual object tracking in the visible light camera image.

At the second point of time t2, a finger touches the real object. Both in the image 712 captured by the visible light camera and the infrared thermal image 722, it is not apparent if the finger actually touches the object or not. The Augmented Reality view 732 shows the same virtual information as in 731, again spatially registered with the real object, which moved between t1 and t2, and is partly occluded by the hand.

At the third point of time t3 the finger moved away from the real object, which is apparent in both the visible light camera image 713 and the infrared thermal image 723. However, the infrared thermal image 723 also reveals a warm spot on the object, which is indicative of that the finger actually touched the object. This touch is identified and localized according to an embodiment of this invention (using any of the approaches described herein) and then used to manipulate the virtual information related to the real object. In this case, the pressed virtual button (No. 5) is shown highlighted in the AR view 733 and the virtual display on top also changed its state according to the touch event (now showing "285" instead of "28" as in previous AR view 732).

At some later point of time t4, the object is still held in a hand (visible light camera image 714), but the warm spot disappeared from the infrared thermal image 724. The Augmented Reality view 734 shows the virtual information spatially registered with the object, which again moved. The virtual button (No. 5) is not highlighted anymore because the touch event triggered at t3 is outdated. However, the state of the virtual display on top is still affected by that touch event as it shows the number "285" instead of "28" as for t1 and t2.

Note that in this example the virtual information is correctly occluded by the hand. This can be achieved by using thermo key (e.g., see http://nae-lab.org/project/thermo-key/Thermo key), which uses infrared thermal images to separate human foreground from environment background. Also note that while in this example the real object was located in a hand, it could also be located somewhere in the environment, e.g. located on a table, instead. The latter configuration would be more desirable when using a handheld device such as a smartphone or a tablet PC.

Figure 8:
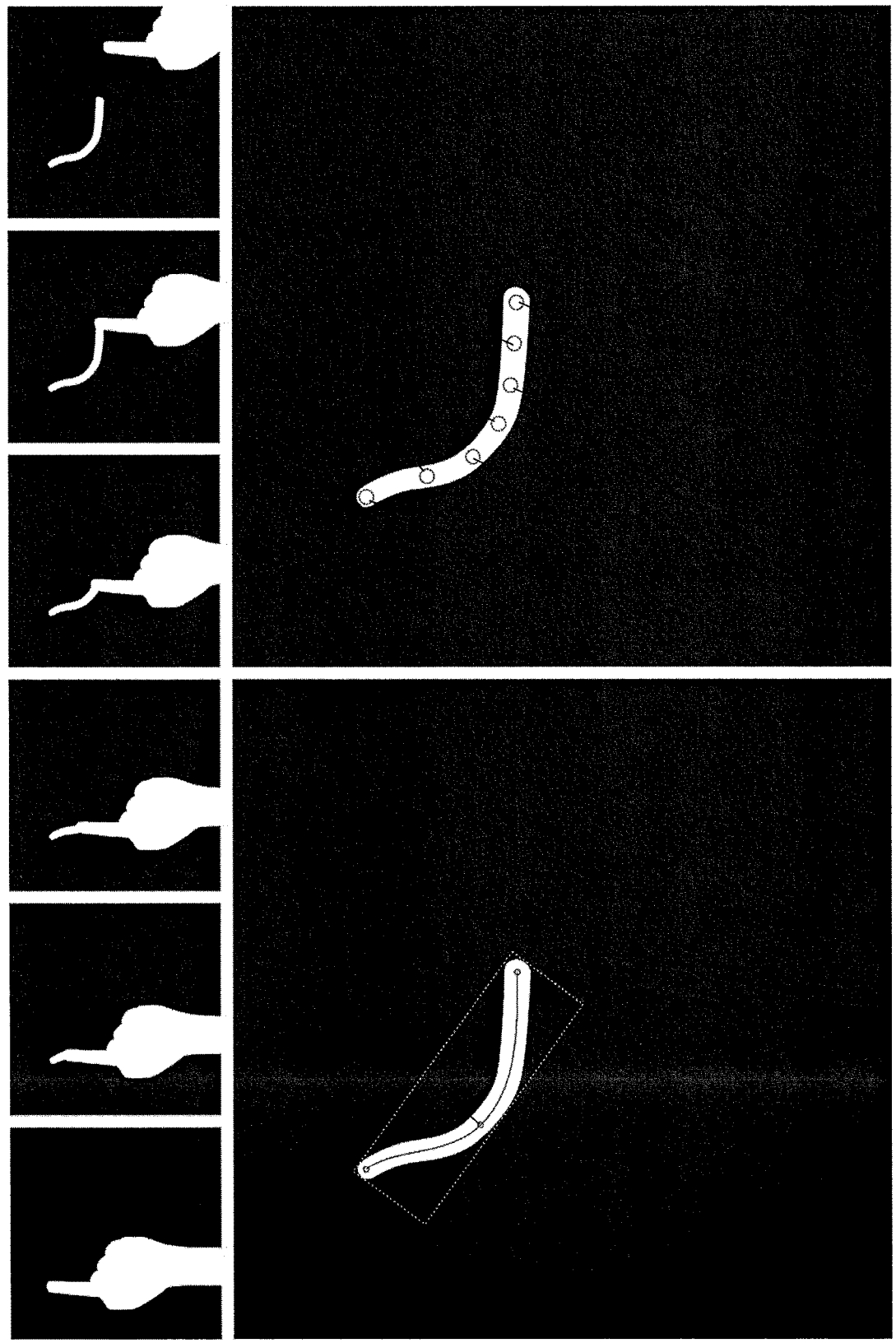
FIG. 8 shows a sequence of infrared thermal images where the first object moves over the surface of the second object during a touch according to an embodiment of the invention.

FIG. 8 shows a sequence of binarized infrared thermal images (801-808) where the first object moves over the surface of the second object during a touch according to an embodiment of the invention. In image 801 a fingertip touches a second object (shown as black background) and then starts moving in images 802-805 while still touching the second object. In the infrared thermal image 806 the finger is released from the second object and moves away. The touch 809 is apparent in the image because it has a different temperature than the second object. In this case the touch has a longish area instead of a close circular one as in the previous examples.

An embodiment fits a bounding box 810 to the detected touch (area) and may provide this to a human machine interface. Another embodiment might fit a function (811) to model the trajectory of the touch. It can for example be parameterized as a set of points, a set of points with estimated timestamps, a Bezier curve, a spline, a polynomial function, or any other function. This can be done based on a single thermal image captured after the touch occurred or while the touch occurs.

Another embodiment may further analyze the differences or changes in temperatures between different parts of the region of the touch to determine a direction of the touch, e.g. as the dominant temperature gradient direction in the touch region.

If a user touches a surface at a first point of an object, then moves the finger over the surface of the object to a second point and then moves the finger away from the object, then the touch region would include the area around the first point, the area around the second point, and the region between those two points where the finger moved over the surface, see 809. Within the touch region there may be different temperatures present (e.g. at samples 820-826). Assuming that the touched object initially had a constant temperature, the temperature at the first point 820 (where the touch started) is lower than the temperature of the second point 826 (where the touch ended). The points in between (821-825) should reveal a monotonic increase in temperature.

Figure 9:
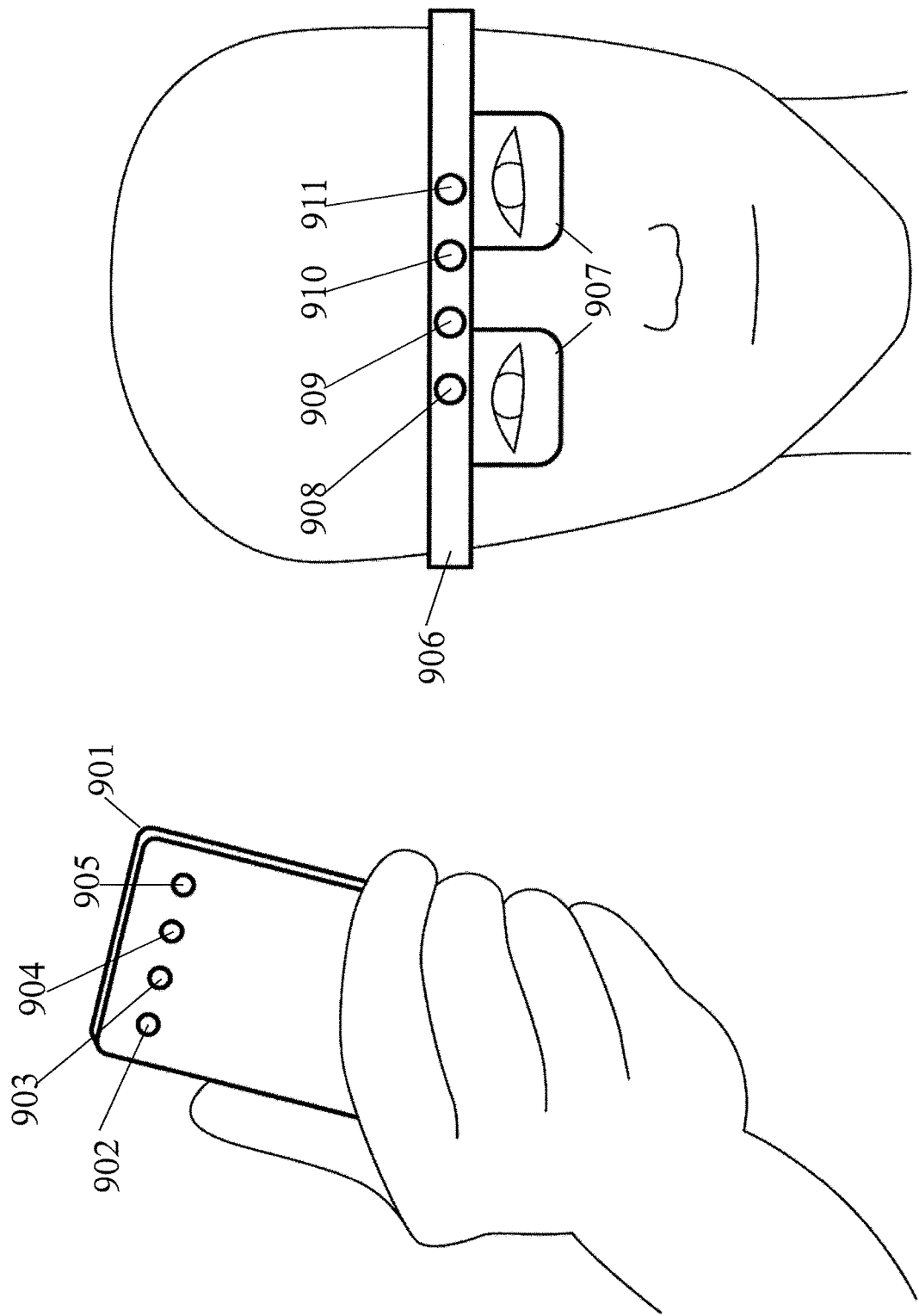
FIG. 9 shows two exemplary hardware setups in the context of the invention, Although various embodiments are described in the following with reference to certain components, any other configuration of components, as described herein or evident to the skilled person, can also be used when implementing any of these embodiments.

FIG. 9 shows two exemplary hardware setups that could be used in connection with the present invention. The method described herein could be performed on and the device described herein could be (part of) a handheld device 901 such as a smartphone or a tablet computer equipped with a thermographic camera 902. The device may further comprise at least one visible light camera 903, an infrared camera 904, and/or an infrared or visible light projector 905. According to another embodiment, the method described herein could be performed on and the device described herein could be (part of) a head-mounted (or wearable) computer 906 with at least one display 907 and a thermal camera 908. The device may further comprise at least one visible light camera 909, an infrared camera 910, and/or an infrared or visible light projector 911.

It is also possible to apply the method and device described herein for detecting more than one touch happening at a time.

The embodiments described above may provide the position (i.e. a point) of a touch in the coordinate system of the infrared thermal camera image. They may further provide the region in the image which corresponds to the touched surface. If the region is not (close to) circular, this invention may further determine one or more orientation of the touch, e.g. as the orientation with the largest extent of the touch region. Another embodiment determines the trajectory of a touch. Further embodiments additionally determine the direction of a touch, i.e. in which order the points on the trajectory were touched.

One or more touches and their trajectories determined by an embodiment of this invention can be used to support (multi) touch gestures such as swipe, pinch, pinch-to-zoom, pinch-close, pinch-open, rotate, twist-rotate, pivot-rotate, scroll, pan, flick, two-finger-tap, and two-finger-scroll.

Different means can be applied to avoid the detection of touches in certain regions. In the example of FIG. 7, only touches that are positioned at one of the virtual buttons are relevant. Therefore, a mask can be provided dividing the surface of the object into parts where touches should be detected and parts where touches should not be detected or ignored after detection. One possible implementation would be to render this mask into the infrared thermal image given the transformations 608 and 607 in FIG. 6 before processing of the infrared thermal image.

Touches should always be positioned on the surface of a real object of which a model is required. In one embodiment where the visible light camera is capable of measuring depth or in case an additional depth-sensing camera exists, this could be used to determine the 3D position of the touch. Any detected touch with a distance to the surface model of the object above a threshold does not lie on the model surface and can therefore be discarded.

Unintended touches by objects other than at least of a human body, e.g. a sleeve hem, are implicitly ignored by the embodiments described above if its temperature differs significantly from the temperature of a human body. Another embodiment explicitly enforces that detected touches are due to the touch of at least part of a human hand by detecting hands in a sequence of infrared thermal camera images and/or a visible light camera images. Touches may then only be detected in those regions (in the coordinate system of an object, or a camera) where a hand has been present before according to the hand detection. Another embodiment further detects the position of fingertips in a sequence of infrared thermal camera images and/or a visible light camera images and then limits touch detection to those regions (in the coordinate system of an object, or a camera) where a fingertip has been present before according to the fingertip detection.

Another embodiment excludes all regions from touch detection that once had a temperature above the temperature of a human body by more than a threshold. Such temperatures may be caused by electronic devices, or coffee mugs.

Although various embodiments are described herein with reference to certain components or devices, any other configuration of components or devices, as described herein or evident to the skilled person, can also be used when implementing any of these embodiments. Any of the devices or components as described herein may be or may comprise a respective processing device (not explicitly shown), such as a microprocessor, for performing all or some of the tasks as described herein. One or more of the processing tasks may be processed by one or more of the components or their processing devices which are communicating with each other, e.g. by a respective point to point communication or via a network, e.g. via a server computer.

The invention claimed is:

1. A method of detecting a touch between at least part of a first object and at least part of a second object, wherein the at least part of the first object has a different temperature than the at least part of the second object, comprising the steps of:
   receiving a thermal image of a portion of the second object;
   determining temperature measurements based on different locations in the thermal image;
   determining a derivative of temperature with respect to position in the thermal image based on the temperature measurements, the temperature measurements corresponding to a sample line in the thermal image; and
   determining a touch between the at least part of the first object and the at least part of the second object has occurred in response to a determination that the derivative of temperature with respect to position in the thermal image indicates:
      a first section of the sample line is associated with a first rate of change in temperature with respect to position;
      a second section of the sample line adjacent to the first section is associated with a second rate of change in temperature with respect to position greater than the first rate of change; and
      a third section of the sample line adjacent to the second section is associated with a third rate of change in temperature with respect to position greater than the second rate of change.

2. The method according to claim 1, wherein the first object corresponds to a portion of a human body.

3. The method according to claim 1, further comprising determining a position, a size, an orientation, a direction, a trajectory, or a shape of the touch in the thermal image.

4. The method according to claim 1, further comprising outputting an indication of the touch to a machine interface program, wherein the machine interface program changes states based on the indication.

5. The method according to claim 1, wherein detecting the touch further comprises determining one or more differences between temperatures measured at different locations in the thermal image.

6. The method according to claim 1, wherein the at least part of the second object is not shown in the thermal image.

7. The method according to claim 1, wherein the at least part of the first object is not shown in the thermal image.

8. The method according to claim 1, wherein the thermal image corresponds to a moment during which the at least part of the first object and the at least part of the second object are touching.

9. The method according to claim 1, wherein the thermal image corresponds to a moment after which the at least part of the first object and the at least part of the second object have touched.

10. The method according to claim 1, wherein the derivative corresponds to a first derivative.

11. The method according to claim 1, wherein the derivative corresponds to a second derivative.

12. The method according to claim 1, wherein the first object and the second object are three dimensional.

13. The method according to claim 1, further comprising:
capturing an image of the portion of the second object using a visible light camera, wherein the thermal image is received from a thermal camera;
determining a first spatial transformation between the visible light camera and the thermal camera;
determining a second spatial transformation between the visible light camera and the portion of the second object,
determining, based on the first and second spatial transformations, a third spatial transformation between a coordinate system of the portion of the second object and a coordinate system of the thermal camera,
determining a position and orientation of the thermal camera in the coordinate system of the portion of the second object based on the third spatial transformation.

14. The method according to claim 1, wherein the method is applied within a human machine interface in an Augmented Reality application.

15. The method according to claim 1, wherein the method is used within an application using one of a video-see-through setup, an optical-see-through setup, and a projective augmented reality setup.

16. A non-transitory computer readable storage medium storing software code sections executable by a processor to:
receive a thermal image of a portion of a second object;
determine temperature measurements based on different locations in the thermal image;
determine a derivative of temperature with respect to position in the thermal image based on the temperature measurements, the temperature measurements corresponding to a sample line in the thermal image; and
determine a touch between the at least part of the first object and the at least part of the second object has occurred in response to a determination that the derivative of temperature with respect to position in the thermal image indicates:
a first section of the sample line is associated with a first rate of change in temperature with respect to position;
a second section of the sample line adjacent to the first section is associated with a second rate of change in temperature with respect to position greater than the first rate of change; and
a third section of the sample line adjacent to the second section is associated with a third rate of change in temperature with respect to position greater than the second rate of change.

17. A device for detecting a touch between at least part of a first object and at least part of a second object, wherein the at least part of the first object has a different temperature than the at least part of the second object, comprising:
a processing device adapted to receive a thermal image of a portion of the second object,
the processing device configured to determine temperature measurements based on different locations in the thermal image;
the processing device configured to determine a derivative of temperature with respect to position in the thermal image based on the temperature measurements, the temperature measurements corresponding to a sample line in the thermal image; and
the processing device configured to, determine a touch between the at least part of the first object and the at least part of the second object has occurred in response to a determination that the derivative of temperature with respect to position in the thermal image indicates:
a first section of the sample line is associated with a first rate of change in temperature with respect to position;
a second section of the sample line adjacent to the first section is associated with a second rate of change in temperature with respect to position greater than the first rate of change; and
a third section of the sample line adjacent to the second section is associated with a third rate of change in temperature with respect to position greater than the second rate of change.

* * * * *